Figure 1:
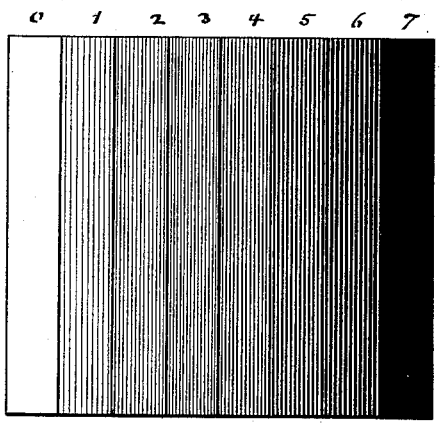

(Specimens.)

C. A. MÜLLER.
TRANSLUCENT FILM FOR USE IN THE ART OF PHOTO-ENGRAVING.

No. 401,510. Patented Apr. 16, 1889.

WITNESSES:

INVENTOR
Carl August Müller
BY
ATTORNEYS.

UNITED STATES PATENT OFFICE.

CARL AUGUST MÜLLER, OF NEW YORK, N. Y., ASSIGNOR OF ONE-FOURTH TO OTTO BÜHLER, OF SAME PLACE.

TRANSLUCENT FILM FOR USE IN THE ART OF PHOTO-ENGRAVING.

SPECIFICATION forming part of Letters Patent No. 401,510, dated April 16, 1889.

Application filed May 28, 1887. Serial No. 239,611. (Specimens.)

*To all whom it may concern:*

Be it known that I, CARL AUGUST MÜLLER, of the city, county, and State of New York, have invented a certain new and useful Improvement in Translucent Films for Use in the Art of Photo-Engraving, of which the following is a specification.

This invention relates to a method of producing impressions in lines or stipples from photographic negatives by reproducing the body-shades or half-tones of the photograph in an exact and perfect manner for the purpose of producing relief-plates for the printing-press or fine lithographic work, to which process I have given the name of "type-photography," as it surpasses in the accurate reproduction of the half-tones the reproduction of the same in wood or other engravings.

For the purpose of changing a photograph of a natural object or work of art into a print or engraving in lines or stipples, I copy any photographic negative or positive through a transparent film which is covered with a number of geometrical figures, to which I have given the name of "grain-figures." Each grain-figure is composed of a number of gradated shades or tints. The light passes through the negative or positive and the transparent grain-film onto a sensitized plate until the proper degree of intensity is produced by each grain-figure on said plate. By the interposition of a transparent grain-film between the negative or positive and the sensitized plate each grain-figure dissolves the corresponding surface of the negative in its fundamental colors, with the exception of the highest lights and deepest shades only in an inverse ratio. Each grain-figure forms for itself a gradated scale of all tints between the fundamental colors, black and white. The different gradations or degrees of tints of each grain-figure are in exact proportion to the ratio of intensity in the same manner as the corresponding portion of the surface of the negative is to the surface of the grain-figure, so that in copying a negative or positive through the transparent grain-film more or less intensely-covered portions are formed, which are at the inverse ratio to the mixture of the shades of the negative or positive. By copying through a transparent grain-film an exact reproduction, theoretically, of a tinted surface in pure lines and stipples is obtained, according to the principles of the art of photography. Consequently an entire picture is a mathematically-correct reproduction of a photograph in minute grains, either lines or stipples, if the copied parts are considered as absolutely black portions. The parts which are produced in tints by the reproduction are made non-transparent by any of the known chemical processes used in the art of photography and photo-chemistry, so that a negative or positive in grain or lines is obtained. Thus a picture can be obtained by dusting the sensitized plate with rosin-powder and transferring the same to a stone or metal plate, and it can be etched, &c. These means of transferring, etching, and printing in lines or stipples are well known to every photo-lithographic operator and photo-chemist, and require no further description. The grain which is obtained by my method corresponds to the different degrees of shades of the negative and positive. The greater the number of gradations of tints of which each grain-figure is composed the better will the half-tones be reproduced. The smaller the number of gradations of tints used in each grain-figure the more will the medium tints of the original be reproduced, so that the picture appears consequently harder and crisper in the half-tones.

Figure 2:
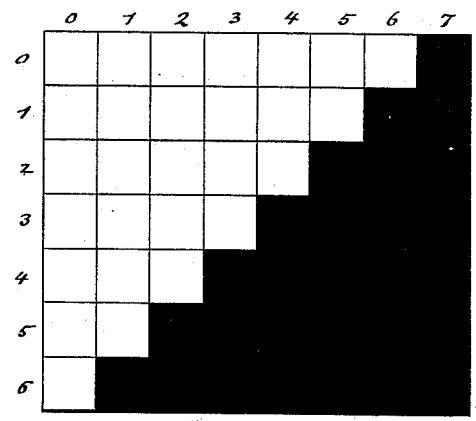

In the accompanying drawings, Figure 1 shows a negative having seven gradations or shades of tint. O represents the first or white and transparent gradation, and 7 the last or more intense tint, while the intermediate gradations correspond to different degrees of intensity. The combined intensity of the first and sixth, for instance, is equal to the seventh gradation, also that of the second and fifth, third and fourth, &c. If this negative is crossed by a similar negative having six gradations or shades of tints, but not including the seventh, the diagram shown in Fig. 2 is obtained, which represents the degree of intensity of the intersecting scales, and which shows that the zero gradation copies up to six, the first up to the fifth, the second up to the fourth, and so on, while the remaining tints assume the greatest degree of intensity. The diminution of the tinted surface is equal to the increase of the ratio of intensity. The darkest parts are in the same ratio to the reproduced parts as the different gradations of tints to the ratio of intensity. The most intense parts are in the same proportion to the reproduced parts as the ratio of the intermixture of the fundamental colors, black and white, of the negative. This ratio of intermixture of a certain shade of tint forms also the theoretical foundation, which is followed in the reproduction of such a shade or tint by the art of the engraver.

Figure 3:
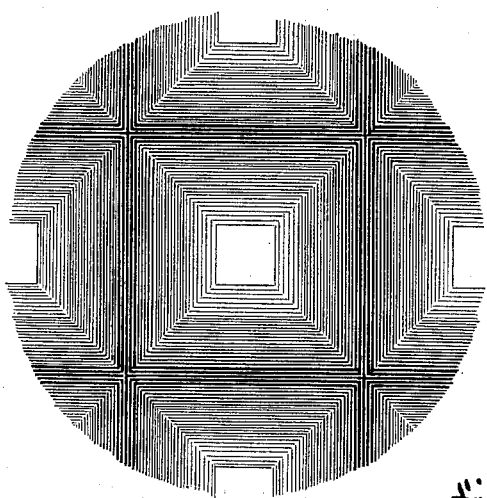
Figure 4:
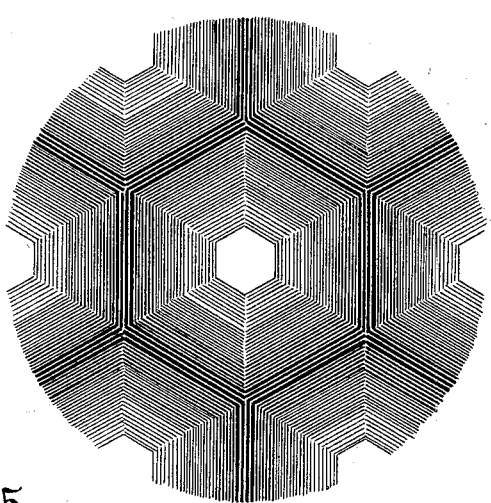
Figure 5:
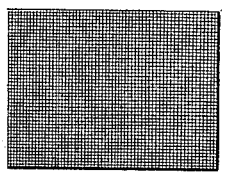

The rules just stated determine the proportion of the different gradations and the size of the surface of each grain-figure, which can be made in different geometrical configurations, as shown in Figs. 3 and 4. Each grain-figure is composed of five, seven, or more different gradations, which increase in intensity either from the center to the edges or vice versa, and the surface of each gradation is equal in area to either one of the remaining gradations. The exterior lines of each grain-figure are also parts of the adjoining figures. The marginal line, which is either the next to the deepest shade or next to the highest light of each grain-figure, forms also a part of the adjoining grain-figures. The deepest degree of shade is excluded from each grain-figure, because it will be reproduced by the negative without the use of the grain-films. For producing the transparent grain-films a number of mathematically-exact grain-figures are first drawn on a large scale and reduced by photography to a smaller scale. This is again reduced to the degree of fineness required for the grain, as shown in Fig. 5. From this negative having the necessary degree of fineness of grain, gelatine or other transparent films are made, which are used as the transparent grain-film in the manner before described. The grain can also be produced by any of the known photographic-printing processes. These films containing my grain-figures are prepared ready made as an article of commerce and sale, and are made up in suitable quantities and used for carrying out my method of producing impressions in lines or stipples from photographic negatives.

In place of gelatine, collodion or any other thin transparent medium can be used, on which the grain-figures are directly produced by means of the negative or positive, which serves for reproducing the grain-figure. The film of grain-figures may also be produced directly on the negatives or positives, in which case a still thinner film is obtained.

Having thus described my invention, I claim as new and desire to secure by Letters Patent—

A translucent film for use in the art of photo-engraving, provided with a number of small grain-figures, each figure being composed of a series of bands of different shades representing different tints or tones, each band having the same shade throughout its area, and the area of one band being equal to the area of each of the other bands, substantially as described.

In testimony that I claim the foregoing as my invention I have signed my name in presence of two subscribing witnesses.

CARL AUGUST MÜLLER.

Witnesses:
   PAUL GOEPEL,
   CARL KARP.